US009899004B2

(12) United States Patent
Zheng et al.

(10) Patent No.: US 9,899,004 B2
(45) Date of Patent: Feb. 20, 2018

(54) METHOD AND DEVICE FOR GENERATING GRAPHICAL USER INTERFACE (GUI) FOR DISPLAYING

(71) Applicant: MediaTek Singapore Pte. Ltd., Singapore (SG)

(72) Inventors: Zijie Zheng, Shenzhen (CN); Cheng Chen, Shenzhen (CN); Chenli Zhang, Shenzhen (CN)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 504 days.

(21) Appl. No.: 14/592,160

(22) Filed: Jan. 8, 2015

(65) Prior Publication Data

US 2015/0193097 A1 Jul. 9, 2015

(30) Foreign Application Priority Data

Jan. 8, 2014 (CN) .......................... 2014 1 0008804

(51) Int. Cl.

*G06F 3/0482* (2013.01)
*G06T 1/20* (2006.01)
*G09G 5/14* (2006.01)
*G09G 5/393* (2006.01)

(52) U.S. Cl.

CPC ............... *G09G 5/14* (2013.01); *G09G 5/393* (2013.01); *G09G 2340/12* (2013.01); *G09G 2354/00* (2013.01); *G09G 2360/18* (2013.01)

(58) Field of Classification Search

None

See application file for complete search history.

(56) References Cited

U.S. PATENT DOCUMENTS

2010/0058229 A1* 3/2010 Mercer ................. G06F 9/4443 715/788
2013/0328922 A1* 12/2013 Belanger ................. G06T 11/00 345/629

FOREIGN PATENT DOCUMENTS

CN 101071380 A 11/2007
CN 101228571 A 7/2008
CN 102576287 A 7/2012

* cited by examiner

*Primary Examiner* — Yingchun He

(74) *Attorney, Agent, or Firm* — McClure, Qualey & Rodack, LLP

(57) ABSTRACT

Methods and devices for generating Graphical User Interface (GUI) for displaying are provided, wherein the GUI is generated based on a plurality of windows. The method for generating GUI includes the step of: separately drawing a plurality of pictures into the plurality of windows, separately composing each of the plurality of windows with pictures into a corresponding one of a plurality of buffers, and mixing the plurality of pictures in the plurality of buffers to obtain the GUI for displaying on a screen.

18 Claims, 7 Drawing Sheets

METHOD AND DEVICE FOR GENERATING GRAPHICAL USER INTERFACE (GUI) FOR DISPLAYING

CROSS REFERENCE TO RELATED APPLICATIONS

This application claims priority of China Patent Application No. 201410008804.6, filed on Jan. 8, 2014, the entirety of which is incorporated by reference herein.

BACKGROUND OF THE INVENTION

Field of the Invention

The invention generally relates to display technology, and more particularly, to a method and device for generating graphical user interface for displaying.

Description of the Related Art

Graphical User Interface (hereinafter referred to as GUI) refers to graphical-displayed user interface. Generation of the GUI can give users better visual enjoyment.

Currently, displaying of a GUI on the screen can be achieved by first drawing a plurality of windows, and then drawing, by a graphic processing unit (hereinafter referred to as GPU), pictures into the plurality of windows, followed by composing the windows drawing with the pictures in the buffers by using the composition ability of the GPU, and finally displaying the GUI on the screen through the on screen display (OSD).

In currently existing technologies, as the GPU not only draws the pictures but also composes them and single buffer is utilized to achieve the composition of the plurality of windows drawing with the pictures, the GPU may have the low efficiency for processing the pictures, resulting in rapidly dropping in the frame rate of displaying the GUI such that the human eyes cannot see a coherent and smooth screen on the display.

BRIEF SUMMARY OF THE INVENTION

Accordingly, embodiments of the invention provide the following technology.

In accordance with one embodiment of the present invention, the present invention provides a method for generating a Graphical User Interface (GUI) for displaying, wherein the GUI is generated based on a plurality of windows, the method comprises:

separately drawing a plurality of pictures for generating the GUI into the plurality of windows;

separately composing each of the plurality of windows drawing with the pictures into a corresponding one of a plurality of buffers; and mixing the plurality of pictures in the plurality of buffers to obtain the GUI for displaying on a screen.

In accordance with another embodiment of the present invention, the present invention provides a device for generating Graphical User Interface (GUI) for displaying, the device comprises:

a plurality of buffers;

a first graphic processing unit (GPU) which is coupled to the plurality of buffers for separately drawing a plurality of pictures for generating the GUI into a plurality of windows, and separately composing each of the plurality of windows drawing with the pictures into a corresponding one of the buffers; and a mixer which is coupled to the buffers for mixing the plurality of pictures in the plurality of buffers to obtain the GUI for displaying on a screen.

In accordance with yet another embodiment of the present invention, the present invention provides a device for generating Graphical User Interface (GUI) for displaying, the device comprises:

a plurality of buffers;

a first graphic processing unit (GPU) which is coupled to the plurality of buffers for separately drawing a plurality of pictures into a plurality of windows;

a second GPU which is coupled to the plurality of buffers for separately composing each of the plurality of windows drawing with the pictures into a corresponding one of the buffers; and a mixer which is coupled to the buffers for mixing the plurality of pictures in the plurality of buffers to obtain the GUI for displaying on a screen, wherein the first GPU is different from the second GPU.

The beneficial effects of the embodiments are: compared with the prior art, methods and devices for generating a GUI for displaying of the present invention use a plurality of buffers to separately store pictures in a plurality of corresponding windows, thereby improving the processing efficiency of the devices for generating the GUI for displaying and further increasing the frame rate for displaying the GUI, so as to display coherent and smooth pictures on the screen for viewing by human eyes.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The disclosure and the patent claims use certain words to refer to a particular component. It is understood by ordinary skill in the art that, manufacturers may use different terms to refer to the same component. The disclosure and the claims are not to distinguish between the components in differences in the names, but rather in differences in the functions of the components. The term “coupling” mentioned throughout the disclosure and the claims includes any direct and/or indirect means of electrical coupling. Therefore, if a first device is described as coupled to a second device, it means that the first device is either electrically coupled to the second device directly, or electrically coupled to the second device indirectly through other devices or electric coupling means. The invention can be more fully understood by reading the subsequent detailed description and examples with references made to the accompanying drawings. The following description is of the best-contemplated mode of carrying out the invention. This description is made for the purpose of illustrating the general principles of the invention and should not be taken in a limiting sense. The scope of the disclosure is best determined by reference to the appended claims.

Figure 1:
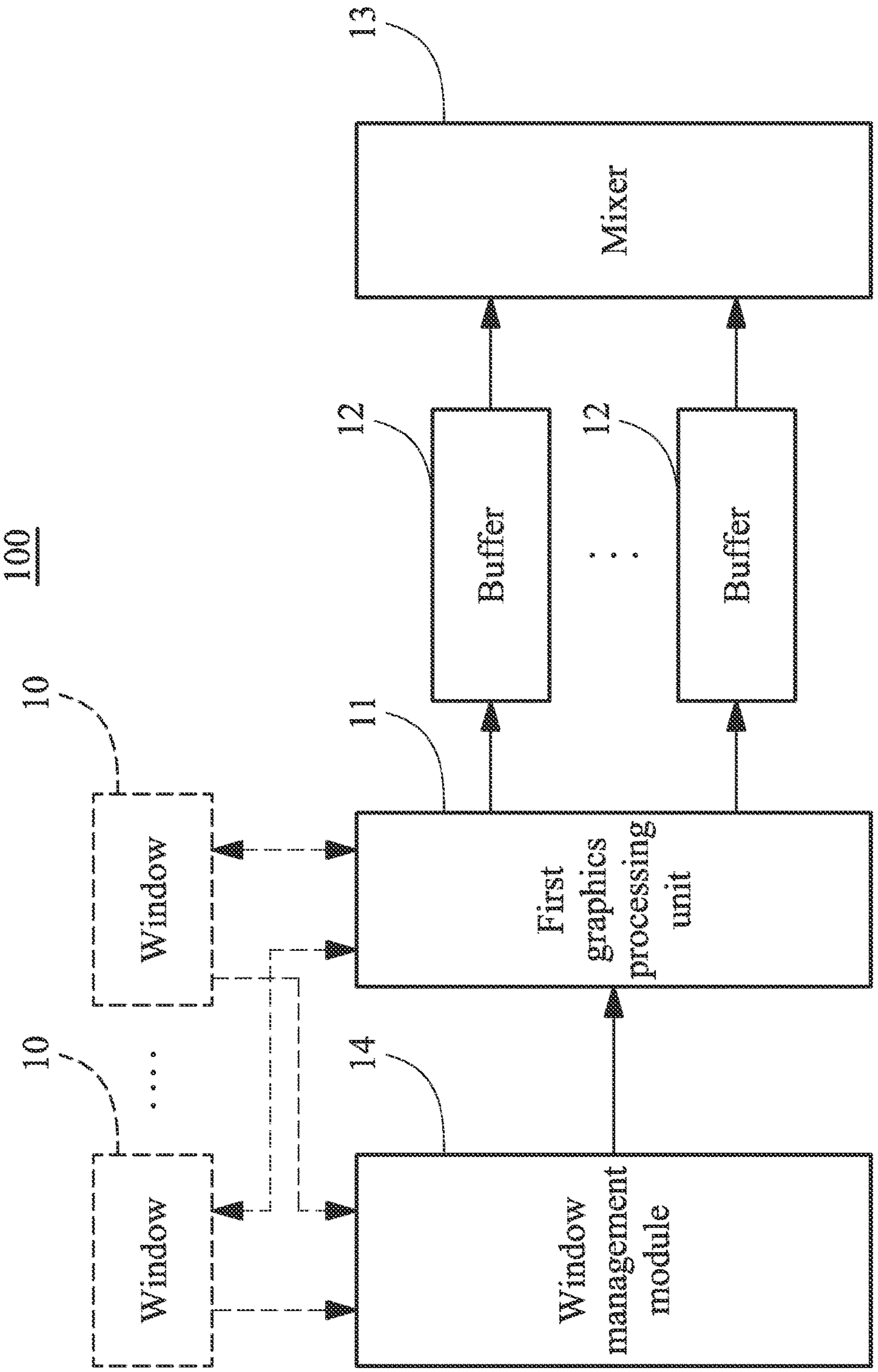
FIG. 1 is a schematic diagram illustrating a structure of a device for generating GUI for displaying according to the first embodiment of the invention.

FIG. 1 is a schematic diagram illustrating a structure of a device for generating GUI for displaying according to the first embodiment of the invention. As shown in FIG. 1, the device for generating GUI for displaying comprises a first GPU 11, a plurality of buffers 12, a mixer 13 and a window management module 14. In addition, the dotted line in FIG. 1 identifies a plurality of windows 10 which can carry pictures for generating the GUI. For example, the buffers 12 are physical buffers (hardware buffers) and the mixer 13 is a plane mixer in the Android system. One of the buffers 12 is an Android system-based frame buffer. In another example, the buffers 12 are not limited to physical buffers with continual physical addresses.

The first GPU 11 and the mixer 13 are respectively coupled to the plurality of buffers 12, wherein, the first GPU is a three-dimensional GPU (hereinafter referred to as the 3D GPU). The window management module 14 is an Android system-based Surfaceflinger.

The first GPU 11 separately draws the pictures for generating the GUI into the windows 10. The windows 10 were created by an application running on an Android system, wherein each window is a virtual window which corresponds to a virtual memory space accessed by the corresponding virtual address. More specifically, the windows 10 are generated by the application calling the corresponding interfaces of the window management module, wherein the number of layers for the pictures in the GUI corresponds to the number of windows. The step that the first GPU 11 separately draws the pictures for generating the GUI into the windows 10 can be achieved by: the first GPU writes the value of each pixel of the picture in each layer of the GUI into a virtual memory space corresponding to the respective window.

Then, based on mapping relationships of the windows 10 drawing with the pictures and the plurality of buffers 12 established by the window management module 14, the first GPU 11 separately composes each of the plurality of windows drawing with the pictures into a corresponding one of the buffers 12. Thereafter, the mixer 13 mixes the plurality of pictures in the plurality of buffers 12 to obtain the GUI for displaying on a screen.

Note that the window management module 14 can establish the mapping relationships of the windows 10 drawing with the pictures and the buffers 12 according to attributes of the pictures or sizes of the pictures. The buffer is a physical storage device with continuous physical address, which can directly read and write the stored content through the address and data bus. The mapping relationships of the buffers and the windows 10 drawing with the pictures can be established according to the attributes of the pictures or the sizes of the pictures.

In addition, the mapping relationships of the buffers and the windows 10 drawing with the pictures can be one window corresponding to one buffer or can also be multiple windows corresponding to one buffer. If one window corresponds to one buffer, the step of separately composing each of the plurality of windows drawing with the pictures into the corresponding one of the buffers can be achieved by: copying, by the first GPU, the value of each pixel in the picture stored in the respective virtual memory space of the window to the physical memory space of the corresponding buffer. If multiple windows correspond to a buffer, in which multiple windows respectively named for the first window, the second window, . . . and the $n^{th}$ window, the step of separately composing each of the plurality of windows drawing with the pictures into the corresponding one of the buffers can be achieved by: copying, by the first GPU, the value of each pixel in the pictures stored in the respective virtual memory space of the first window to the physical memory space of the corresponding buffer; separately composing the value of each pixel in the pictures stored in the respective virtual memory space of the second window and the value of each pixel in the first window which has already stored in the buffer and continually storing the composition result to the buffer; separately composing the value of each pixel in the pictures stored in the respective virtual memory space of the third window and the value of each pixel after the first window and the second window have been composed which has already stored in the buffer and continually storing the composition result to the buffer; . . . and so on, until the completion of the compose operation of the $n^{th}$ window. Taking the windows 10 comprise first and second windows, the pictures comprise a background layer and a dynamic picture and the buffers 12 comprise first and second buffers as an example, the detail process can be that the first GPU 11 draws the background layer into the first window and draws the dynamic picture into the second window. The background layer is a graphic layer, which usually acts as a background or wallpaper, while the dynamic picture usually updates in real-time. The GUI includes the background layer and the dynamic picture.

The window management module 14 may establish the mapping relationships of the windows drawing with the pictures and the buffers according to attributes of the pictures. To be more specific, the window management module 14 further establishes the mapping relationship between the first window drawing with the background layer and the first buffer and establishes the mapping relationship between the second window drawing with the dynamic picture and the second buffer. For example, the first buffer is a physical storage device and the second buffer is an Android system-based frame buffer.

Then, the window management module 14 further determines whether the GUI is displayed for the first time or needs to be refreshed. When the window management module 14 determines that the GUI is displayed for the first time, the first GPU 11 composes the first window drawing with the background layer into the first buffer and composes the second window drawing with the dynamic picture into the second buffer. When the window management module 14 determines that the GUI needs to be refreshed, the first GPU 11 composes the second window drawing with the dynamic picture into the second buffer and keeps content in the first buffer unchanged.

Finally, the mixer 13 mixes the pictures in the first and second buffers to obtain the GUI for displaying on the screen. For example, the pictures in the first and second buffers are mixed into the Android system-based frame buffer to obtain the GUI for displaying.

Taking the windows comprise first, second and third windows, the pictures comprise a first-layer picture, a second-layer picture and a third-layer picture in which the size of the first-layer picture is as same as that of the second-layer picture, and the plurality of buffers comprise first and second buffers as an example, the detail process for GUI displaying can be:

The first GPU 11 draws the first-layer picture into the first window, draws the second-layer picture into the second window and draws the third-layer picture into the third window.

The window management module 14 further establishes the mapping relationships of the windows drawing with the pictures and the buffers according to the sizes of the pictures. To be more specific, due to the first-layer picture and the second-layer picture are with the same size, the window management module 14 may establish the mapping relationship between the first window drawing with the first-layer picture and the first buffer and establish the mapping relationship between the second window drawing with the second-layer picture and the first buffer. In other words, multiple windows drawing with the same size of pictures corresponds to a same buffer. In addition, the window management module 14 may further establish the mapping relationship between the third window drawing with the third-layer picture and the second buffer.

The first GPU 11 may then compose the first window drawing with the first-layer picture and the second window drawing with the second-layer picture into the first buffer and compose the third window drawing with the third-layer picture into the second buffer.

Finally, the mixer 13 mixes the pictures in the first and second buffers to obtain the GUI for displaying on the screen. In this case, because the multiple windows drawing with the pictures that have the same size of pictures correspond to the same buffer, the problem of inconsistent window size that requires considerable repeatedly adjustment encountered while composing multiple windows that have different sizes of pictures into the same buffer can be avoided, thereby improving the processing efficiency of the GPU.

Figure 2:
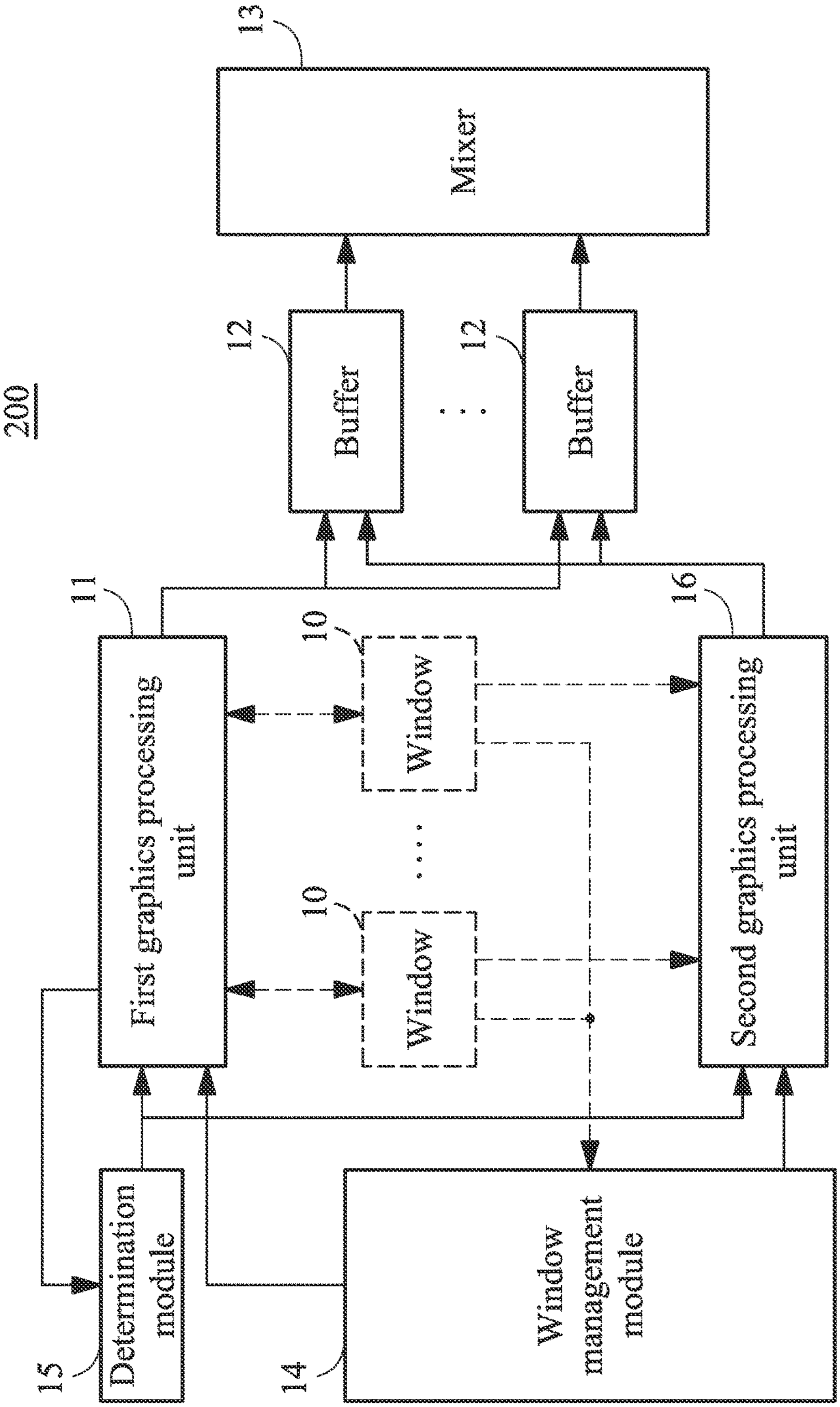
FIG. 2 is a schematic diagram illustrating a structure of a device for generating GUI for displaying according to the second embodiment of the invention.

FIG. 2 is a schematic diagram illustrating a structure of a device for generating GUI for displaying according to the second embodiment of the invention. Note that the modules with similar names in both the FIG. 1 and FIG. 2 are with similar structures and functionalities and thus detailed are omitted here for brevity. Main differences between the device 200 for generating GUI for displaying shown in FIG. 2 and the device 100 for generating GUI for displaying shown in FIG. 1 are:

The device 200 further comprises a determination module 15 and a second GPU 16.

The determination module 15 is coupled to the first GPU 11, and the second GPU 16 is coupled to the buffers 12, the window management module 14 and the determination module 15, wherein the second GPU is a two-dimensional GPU (hereinafter referred to as the 2D GPU).

After the first GPU 11 separately draws the pictures for generating the GUI into the windows 10, the determination module 15 determines whether a utilization of the first GPU 11 has exceeded a predetermined threshold. When the utilization of the first GPU has exceeded the predetermined threshold, the second GPU 16 separately composes the windows drawing with the pictures into the corresponding buffers 12 according to the mapping relationships of the windows 10 drawing with the pictures and the plurality of buffers 12 established by the window management module 14. When the utilization of the first GPU has not exceeded the predetermined threshold, the first GPU 11 separately composes the windows drawing with the pictures into the corresponding buffers 12 according to the mapping relationships of the windows 10 drawing with the pictures and the plurality of buffers 12 established by the window management module 14.

In another embodiment, the determination operation performed by the determination module 15 can also be accomplished by the window management module 14, and thus the determination module 15 can be omitted.

Figure 3:
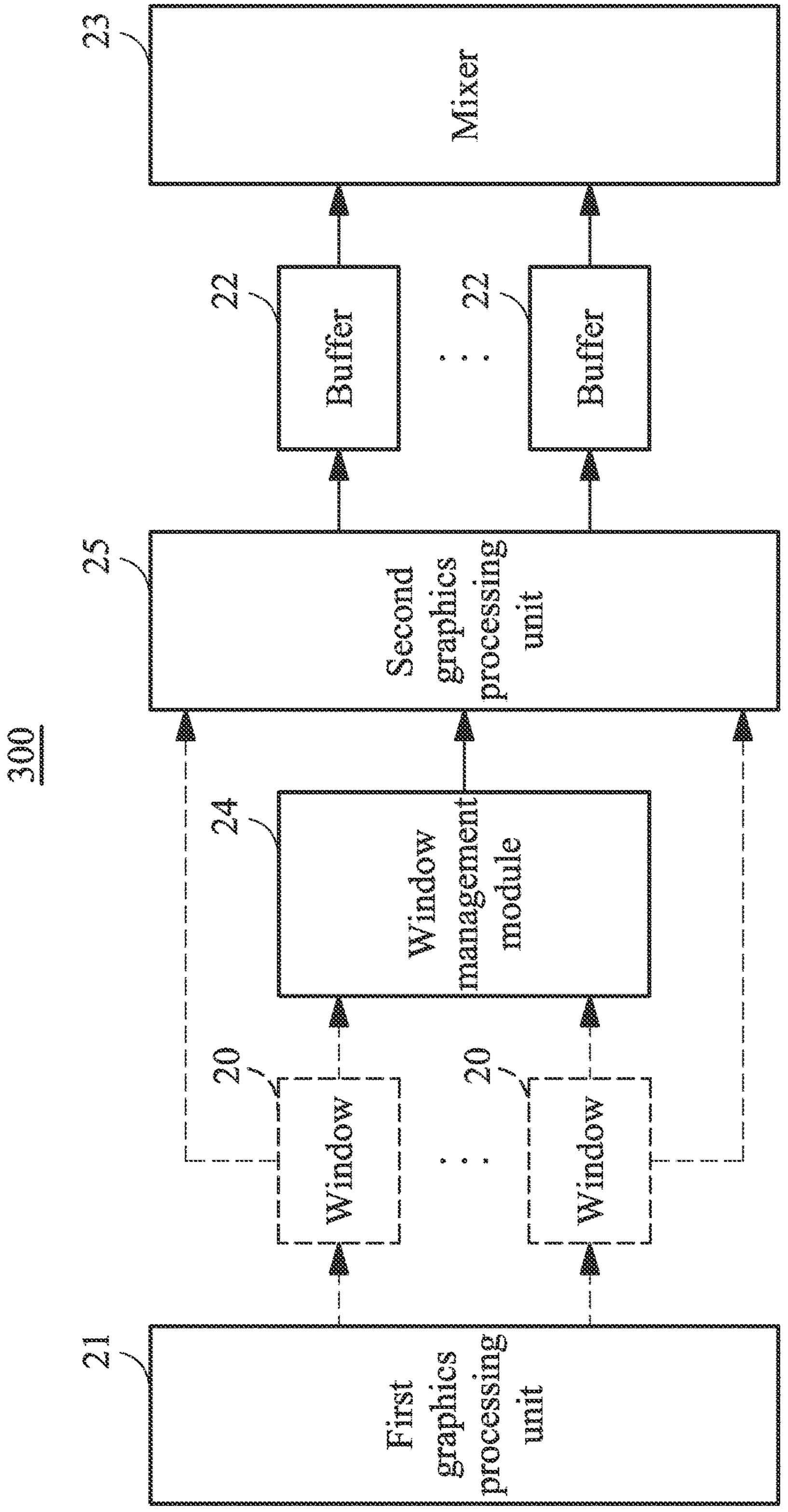
FIG. 3 is a schematic diagram illustrating a structure of a device for generating GUI for displaying according to the third embodiment of the invention.

FIG. 3 is a schematic diagram illustrating a structure of a device for generating GUI for displaying according to the third embodiment of the invention. As shown in FIG. 3, the device 300 for generating GUI for displaying comprises a first GPU 21, a plurality of buffers 22, a mixer 23, a window management module 24 and a second GPU 25. In addition, the dotted line in FIG. 3 identifies a plurality of windows 20 which can carry pictures for generating the GUI. The first GPU can be the 3D GPU and the second GPU can be the 2D GPU, for example. In addition, the second GPU can also be implemented by using other graphic processing modules capable of composing pictures. It is understood that the 2D GPU used herein is as examples only, and the invention is not limited thereto. Note that the modules with similar names in both the FIG. 1 and FIG. 3 are with similar structures and functionalities and thus detailed are omitted here for brevity.

The first GPU 21 separately draws the pictures for generating GUI into the windows 20. The window management module 24 establishes mapping relationships of the windows 20 drawing with the pictures and the buffers 22. The second GPU 25 separately composes each of the windows 20 drawing with the pictures into a corresponding one of the buffers 22. The mixer 23 mixes the pictures in the buffers 22 to obtain the GUI for displaying on the screen.

Taking the windows 20 comprise first and second windows, the pictures comprise a background layer and a dynamic picture and the buffers 22 comprise first and second buffers as an example, the detail process for GUI displaying can be:

The first GPU 21 draws the background layer into the first window and draws the dynamic picture into the second window.

The window management module 14 further establishes the mapping relationship between the first window drawing with the background layer and the first buffer, and establishes the mapping relationship between the second window drawing with the dynamic picture and the second buffer. For example, the first buffer is a physical storage device and the second buffer is an Android system-based frame buffer.

The second GPU 25 composes the first window drawing with the background layer into the first buffer, and composes the second window drawing with the dynamic picture into the second buffer.

The mixer 23 mixes the pictures in the first and second buffers to obtain the GUI for displaying on the screen.

In this case, the second GPU is used to replace the first GPU to complete the task for composing the windows drawing with the pictures into the buffers, so as to reduce the workload of the first GPU and improve the work efficiency of the first GPU.

Further, the window management module 24 can determine whether the GUI is displayed for the first time or needs to be refreshed. When the window management module 24 determines that the GUI is displayed for the first time, the second GPU 25 composes the first window drawing with the background layer into the first buffer and composes the second window drawing with the dynamic picture into the second buffer. When the window management module 24 determines that the GUI needs to be refreshed, the second GPU 25 composes the second window drawing with the dynamic picture into the second buffer and keeps content in the first buffer unchanged.

The third embodiment of the system for generating the GUI for displaying of the present invention can compose the windows drawing with the pictures into the buffers by using the second GPU, thus enhancing the processing efficiency of processing the pictures. Moreover, the window management module can further determine whether the GUI is displayed for the first time or needs to be refreshed such that the system for generating the GUI for displaying does not need to repeatedly compose the first window drawing with the background layer into the buffers, thereby improving overall performance of the system for generating the GUI for displaying about more than one time and further increasing the frame rate for displaying the GUI, so as to display coherent and smooth pictures on the screen for viewing by human eyes.

Figure 4:
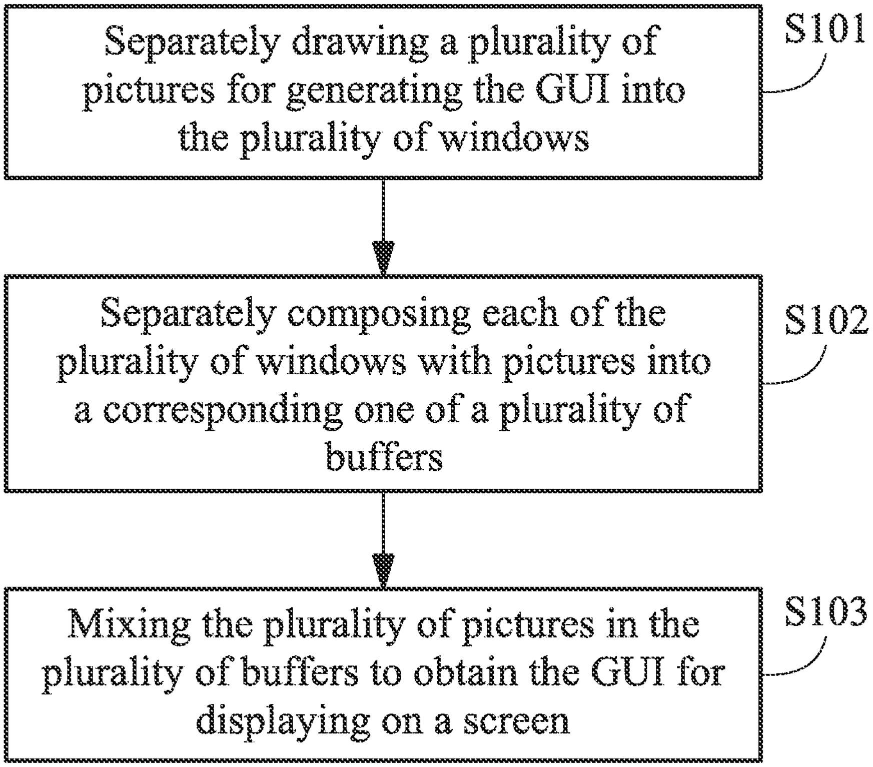
FIG. 4 is a schematic diagram illustrating a flowchart of a method for displaying a graphical user interface according to the first embodiment of the invention.

FIG. 4 is a schematic diagram illustrating a flowchart of a method for displaying a graphical user interface according to the first embodiment of the invention. Note that the method shown in FIG. 4 can be performed by the devices for generating the GUI for displaying 100 and 300 shown in FIG. 1 and FIG. 3, respectively. It is to be noted that if it has substantially the same result, the invention is not limited to the process flow shown in FIG. 4. As shown in FIG. 4, the method comprises the following steps:

Step S101: Separately drawing a plurality of pictures for generating the GUI into the plurality of windows;

Step S102: Separately composing each of the plurality of windows with pictures into a corresponding one of a plurality of buffers; and Step S103: Mixing the plurality of pictures in the plurality of buffers to obtain the GUI for displaying on the screen.

The windows 10 were created by an application running on an Android system, wherein each window is a virtual window which corresponds to a virtual memory space visited by the corresponding virtual address.

Generally, the GUI can be generated by mixing multiple-layer pictures, wherein the number of layers for the pictures in the GUI corresponds to the number of windows. The step of separately drawing the pictures for generating the GUI into the windows can be achieved by: writing, by the GPU, the value of each pixel of the picture in each layer of the GUI into a virtual memory space of the respective window. Wherein, the first GPU is a three-dimensional GPU (hereinafter referred to as the 3D GPU).

In step S102, for example, the buffer is a physical storage device with continuous physical address, which can directly read and write the stored content through the address and data bus. The mapping relationships of the buffers and the windows drawing with the pictures can be established according to the picture attributes or the size of the picture. To be more specific, for example, when the picture attributes are the background layer and the dynamic picture, the background layer and the dynamic picture correspond to different buffers. In addition, the mapping relationships of the buffers and the windows drawing with the pictures can be one window corresponding to one buffer or can also be multiple windows corresponding to one buffer. If a window corresponds to a buffer, the step of separately composing each of the plurality of windows drawing with the pictures into the corresponding one of the buffers can be achieved by: copying, by the GPU, the value of each pixel in the pictures stored in the respective virtual memory space of the window to the physical memory space of the corresponding buffer. If multiple windows correspond to a buffer, in which multiple windows respectively named for the first window, the second window, . . . and the $n^{th}$ window, the step of separately composing each of the plurality of windows drawing with the pictures into the corresponding one of the buffers can be achieved by: copying, by the GPU, the value of each pixel in the pictures stored in the respective virtual memory space of the first window to the physical memory space of the corresponding buffer; separately composing the value of each pixel in the pictures stored in the respective virtual memory space of the second window and the value of each pixel in the first window which has already stored in the buffer and continually storing the composition result to the buffer; separately composing the value of each pixel in the pictures stored in the respective virtual memory space of the third window and the value of each pixel after the first window and the second window have been composed which has already stored in the buffer and continually storing the composition result to the buffer; . . . and so on, until the completion of the compose operation of the $n^{th}$ window. The GPU can be the 3D GPU or 2D GPU.

In step S103, the mixer mixes the pictures in the first and second buffers to obtain the GUI for displaying on the screen.

The first embodiment of the method for generating the GUI for displaying of the present invention can separately draw the pictures for generating the GUI into the windows, separately compose each of the windows with the pictures into the corresponding one of the buffers and then mixing the pictures in the buffers, thus avoiding the use of the GPU to repeatedly read pictures from the buffer and compose them, and thereby improving the processing efficiency of the GPU and further increasing the frame rate for displaying the GUI, so as to display coherent and smooth pictures on the screen for viewing by human eyes.

Figure 5:
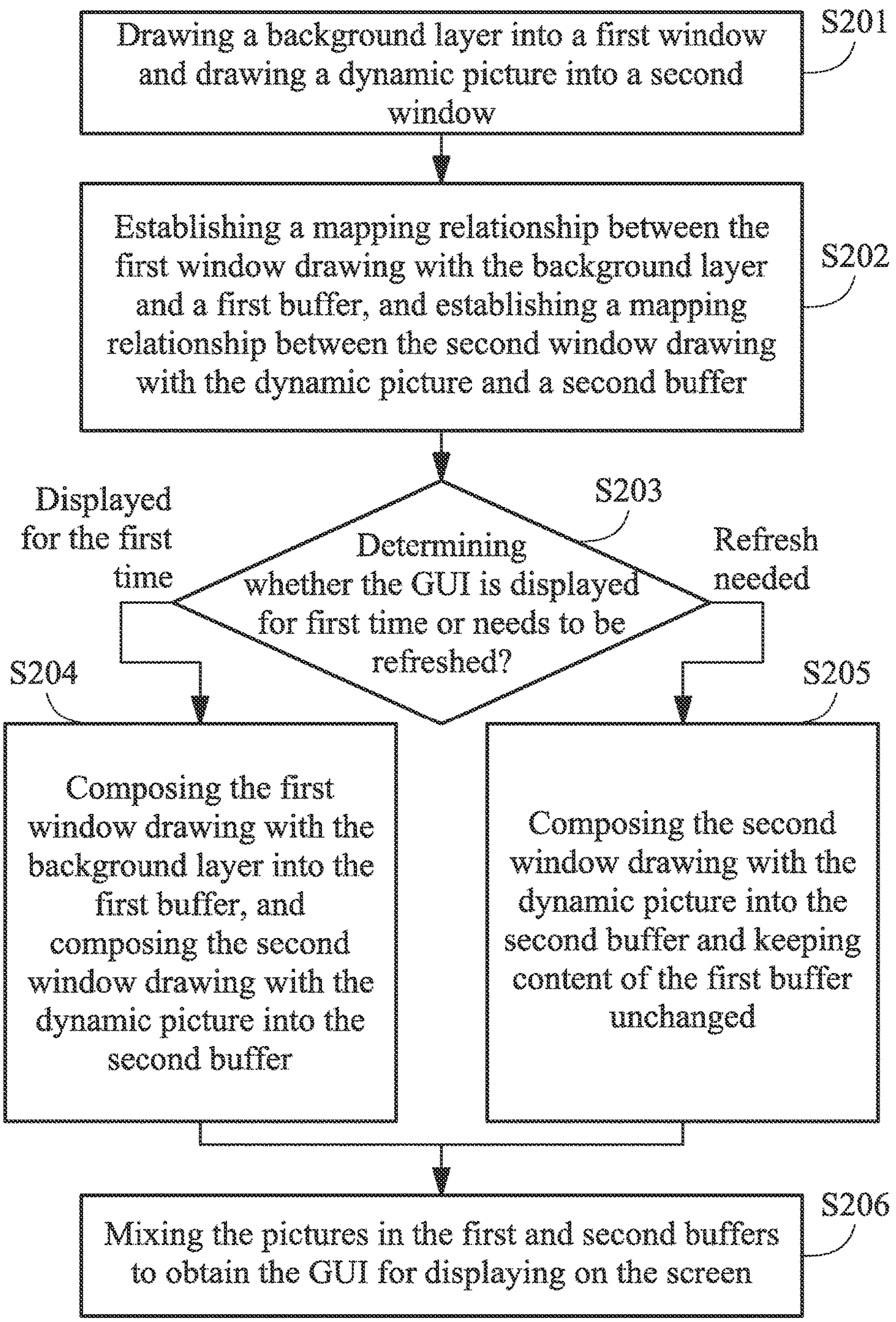
FIG. 5 is a schematic diagram illustrating a flowchart of a method for displaying a graphical user interface according to the second embodiment of the invention flowchart.

FIG. 5 is a schematic diagram illustrating a flowchart of a method for displaying a graphical user interface according to the second embodiment of the invention. This embodiment is based on the GUI including the background layer and the dynamic picture. It is to be noted that if it has substantially the same result, the invention is not limited to the process flow shown in FIG. 5. For example, the method shown in FIG. 5 can be performed by the devices for generating the GUI for displaying 100 and 300 shown in FIG. 1 and FIG. 3, respectively. As shown in FIG. 5, the method comprises the following steps:

Step S201: Drawing a background layer into a first window and drawing a dynamic picture into a second window; wherein, the first and second windows were created by an application running on the Android system and the first and second windows respectively correspond to the background layer and the dynamic picture within the GUI.

The step of drawing the background layer into the first window can be achieved by: writing, by the GPU, the value of each pixel in the background layer to the respective virtual memory space of the first window. The step of drawing the dynamic picture into the second window can be achieved by: writing, by the GPU, the value of each pixel in the dynamic picture to the respective virtual memory space of the second window. The GPU can be the 3D GPU.

In addition, because the dynamic picture within the GUI needs to be updated in real time, the GPU can draw the dynamic picture to be refreshed into the second window in each predetermined time period, wherein the predetermined time period can be set according to the actual situation.

Step S202: Establishing a mapping relationship between the first window drawing with the background layer and a first buffer, and establishing a mapping relationship between the second window drawing with the dynamic picture and a second buffer. In step S202, the first buffer is a physical storage device and the second buffer is an Android system-based frame buffer. Particularly, the mapping relationships are: the first window drawing with the background layer corresponds to the first buffer and the second window drawing with the dynamic picture corresponds to the second buffer.

Step S203: Determining whether the GUI is displayed for first time or needs to be refreshed; if it is displayed for first time, step S204 is performed, and if it needs to be refreshed, step S205 is performed;

Step S204: Composing the first window drawing with the background layer into the first buffer, and composing the second window drawing with the dynamic picture into the second buffer, and step S206 is further performed; In step S204, when the GUI is determined as displayed for the first time in step S203, the GPU copies the value of each pixel in the background layer stored in the respective virtual memory space of the first window to the physical memory space of the first buffer and copies the value of each pixel in the dynamic picture stored in the respective virtual memory space of the second window to the physical memory space of the second buffer. The GPU can be the 3D GPU or 2D GPU.

Step S205: Composing the second window drawing with the dynamic picture into the second buffer and keeping content of the first buffer unchanged, and step S206 is further performed; In step S205, when the GUI is determined as needed to be refreshed in step S203, the GPU copies the value of each pixel in the dynamic picture which is to be refreshed and stored in the respective virtual memory space of the second window to the physical memory space of the second buffer and does nothing for the first buffer. The GPU can be the 3D GPU or 2D GPU.

Step S206: Mixing the pictures in the first and second buffers to obtain the GUI for displaying on the screen. In step S206, the mixer mixes the background layer stored in the first buffer and the dynamic picture stored in the second buffer to obtain the GUI for displaying on the screen.

In this embodiment, dynamic displaying of the GUI can be achieved by repeatedly performing steps S203 to S206 while the GPU draws the dynamic picture to be refreshed into the second window in each predetermined time period.

It is understood by one skill in the art that the GUI including the background layer and the dynamic picture and two buffers are used in this embodiment for illustration purpose only and the invention is not limited thereto. Regardless the number of layers for the still pictures and the dynamic pictures and the number of the buffers being used, as long as the static-background images and dynamic-updated pictures are composed to different buffers that are in line with the spirit of the invention.

The second embodiment of the method for generating the GUI for displaying of the present invention can only compose the second window drawing with the dynamic picture into the second buffer while no composition operation will be performed with the first window drawing with the background layer by determining that the GUI needs to be refreshed, thereby improving the processing efficiency of the GPU and improving overall performance of the system for generating the GUI for displaying about more than one time, and further increasing the frame rate for displaying the GUI, so as to display coherent and smooth pictures on the screen for viewing by human eyes.

Figure 6:
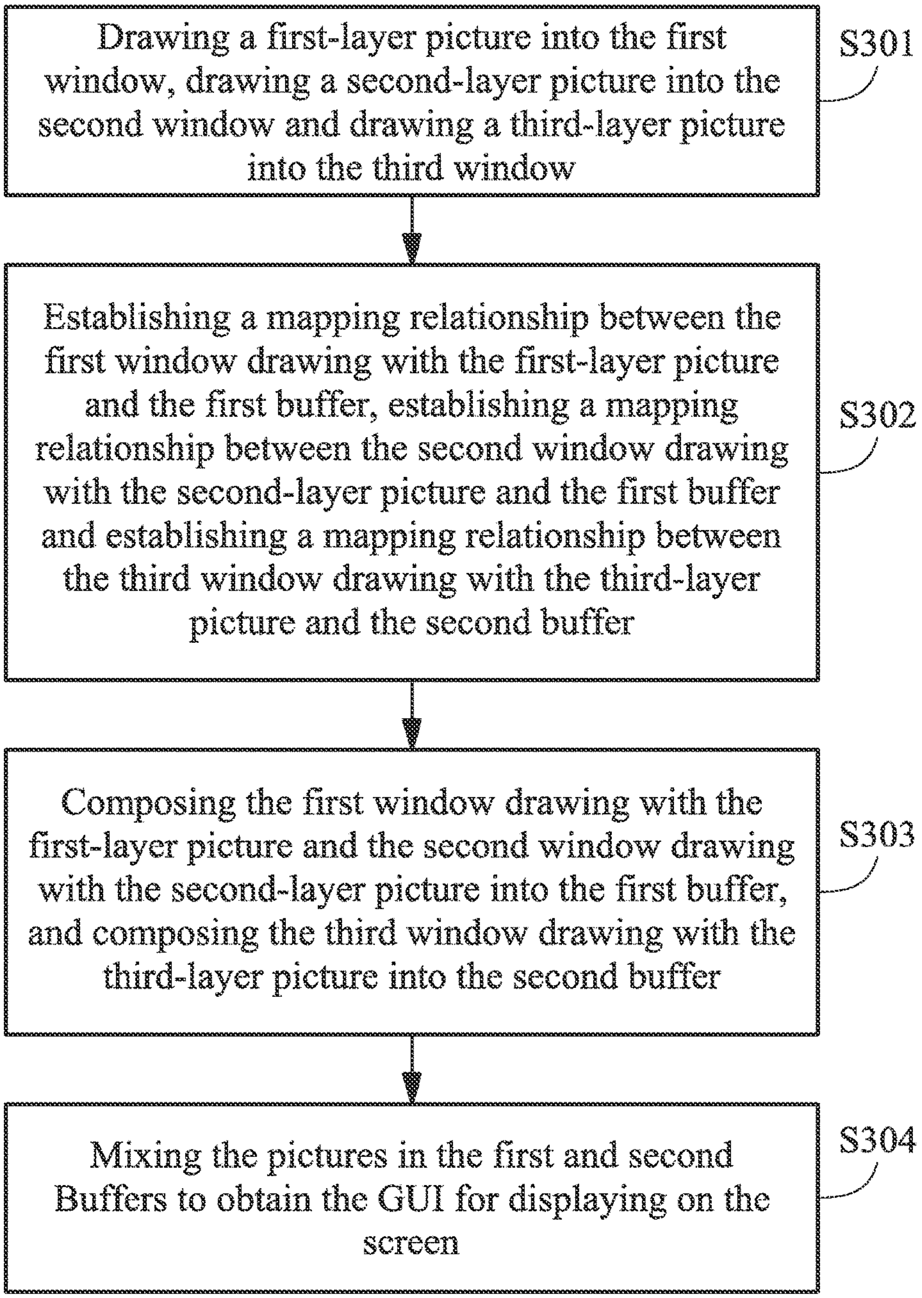
FIG. 6 is a schematic diagram illustrating a flowchart of a method for displaying a graphical user interface according to the third embodiment of the invention.

FIG. 6 is a schematic diagram illustrating a flowchart of a method for displaying a graphical user interface according to the third embodiment of the invention. In this embodiment, the GUI including a first-layer, a second layer and a third layer pictures. It is to be noted that if it has substantially the same result, the invention is not limited to the process flow shown in FIG. 6. For example, the method shown in FIG. 6 can be performed by the devices for generating the GUI for displaying 100 and 300 shown in FIG. 1 and FIG. 3, respectively. As shown in FIG. 6, the method comprises the following steps:

Step S301: Drawing the first-layer picture into the first window, drawing the second-layer picture into the second window and drawing the third-layer picture into the third window; wherein, the first, second and third windows were created by an application running on the Android system and the first, second and third windows respectively correspond to the first-layer picture, the second-layer picture and the third-layer picture. Note that the first-layer picture and the second-layer picture are of the same size, and the size of the third-layer picture can be the same as or different than the size of the first-layer picture/the second-layer picture.

The GPU writes the value of each pixel in the first-layer picture to the respective virtual memory space of the first window, writes the value of each pixel in the second-layer picture to the respective virtual memory space of the second window and writes the value of each pixel in the third-layer picture to the respective virtual memory space of the third window. The GPU can be the 3D GPU.

Step S302: Establishing a mapping relationship between the first window drawing with the first-layer picture and the first buffer, establishing a mapping relationship between the second window drawing with the second-layer picture and the first buffer and establishing a mapping relationship between the third window drawing with the third-layer picture and the second buffer; for example, the first buffer is an Android system-based frame buffer and the second buffer is a physical storage device. In another example, the second buffer can be an Android system-based frame buffer and the first buffer can be a physical storage device. Particularly, the mapping relationships are: the first window drawing with the first-layer picture and the second window drawing with the second-layer picture correspond to the first buffer due to that the first-layer picture and the second-layer picture are of the same size. Additionally, the third window drawing with the third-layer picture corresponds to the second buffer.

Step S303: Composing the first window drawing with the first-layer picture and the second window drawing with the second-layer picture into the first buffer, and composing the third window drawing with the third-layer picture into the second buffer; In step S303, the GPU copies the value of each pixel in the first-layer picture stored in the respective virtual memory space of the first window to the physical memory space of the first buffer, separately composes the value of each pixel in the second-layer picture stored in the respective virtual memory space of the second window and the value of each pixel in the first window which has already stored in the first buffer and continually stores the composition result to the first buffer.

As the first-layer picture and the second-layer picture are of the same size, compared with the composition of the two-layer pictures with different size into the buffer, zoom in or zoom out of the picture is not needed, thus improving the efficiency of picture processing. The GPU may further copy the value of each pixel in the third-layer picture stored in the respective virtual memory space of the third window to the physical memory space of the third buffer. The GPU can be the 3D GPU or 2D GPU.

Step S304: Mixing the pictures in the first and second buffers to obtain the GUI for displaying on the screen. In step S304, the mixer composes the value of each pixel in a composed window which is generated by composing the first and second windows and stored in the first buffer and the value of each pixel in the third window stored in the second buffer to obtain the GUI for displaying on the screen.

It is understood by one skill in the art that the GUI including pictures with three layers and two buffers are used in this embodiment for illustration purpose only and the invention is not limited thereto. Regardless the number of layers for the GUI and the number of the buffers being used, as long as the pictures of the same size are composed into the same buffer that is in line with the spirit of the invention.

The third embodiment of the method for generating the GUI for displaying of the present invention can compose the first and second windows drawing with pictures of the same size into the first buffer and compose the third window drawing with pictures into the second buffer, thereby improving the efficiency of picture processing and further increasing the frame rate for displaying the GUI, so as to display coherent and smooth pictures on the screen for viewing by human eyes.

Figure 7:
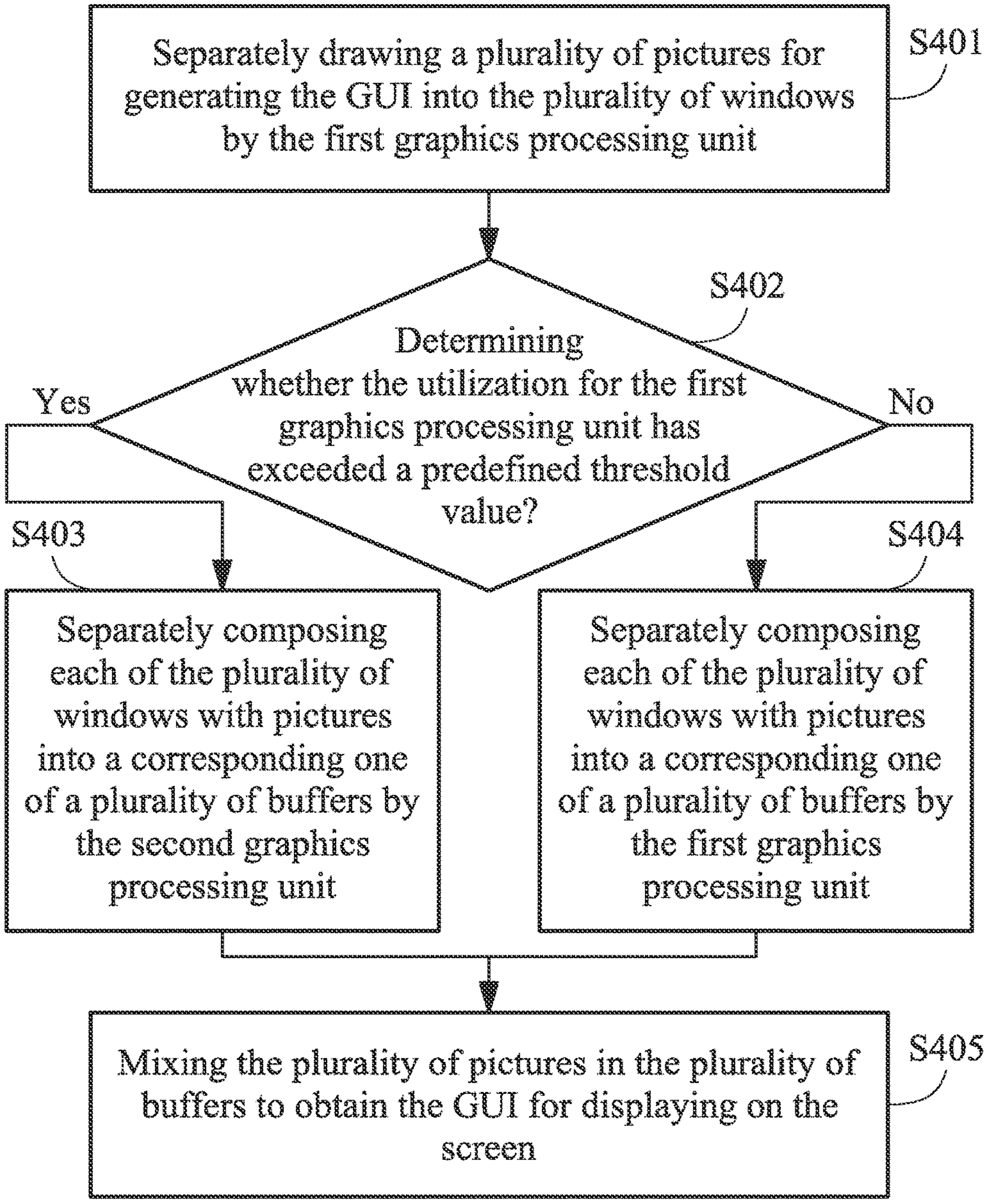
FIG. 7 is a schematic diagram illustrating a flowchart of a method for displaying a graphical user interface according to the fourth embodiment of the invention.

FIG. 7 is a schematic diagram illustrating a flowchart of a method for displaying a graphical user interface according to the fourth embodiment of the invention. It is to be noted that if it has substantially the same result, the invention is not limited to the process flow shown in FIG. 7. For example, the method shown in FIG. 7 can be performed by the device 200 for generating the GUI for displaying as shown in FIG. 2. As shown in FIG. 7, the method comprises the following steps:

Step S401: Separately drawing a plurality of pictures for generating the GUI into the plurality of windows by the first GPU; wherein the windows are virtual windows which were created by the application running on an Android system, wherein each window corresponds to a virtual memory space accessed by the corresponding virtual address.

Step S402: Determining whether a utilization for the first GPU has exceeded a predefined threshold value; if the utilization for the first GPU has exceeded the predefined threshold value, step S403 is performed; and if the utilization for the first GPU has not exceeded the predefined threshold value, step S404 is further performed;

Step S403: Separately composing, by the second GPU, each of the plurality of windows with pictures into a corresponding one of a plurality of buffers and performing the step S405; In step S403, when it is determined that the utilization for the first GPU has exceeded the predefined threshold value in step S402 (e.g. the predefined threshold value is set to be a value of 95%), if the composition operation is still performed by using the first GPU, the efficiency of picture processing may be reduced, resulting in a problem of rapidly decreasing the frame rate for displaying the GUI. In order to avoid the above problem occurs, when it is determined that the utilization for the first GPU has exceeded the predefined threshold value in step S402, the composition operation will be performed by using the second GPU to reduce the processing overhead of the first GPU, thus improving the efficiency of picture processing. The second GPU can be the 2D GPU.

Step S404: Separately composing, by the first GPU, each of the windows drawing with the pictures into a corresponding one of the buffers and performing the step S405; In step S403, when it is determined that the utilization for the first GPU has not exceeded the predefined threshold value in step S402, the composition operation is still performed by using the first GPU.

Step S405: Mixing the pictures in the buffers to obtain the GUI for displaying on the screen. In step S405, the mixer mixes the composed pictures stored in the buffers to obtain the GUI for displaying on the screen.

The fourth embodiment of the method for generating the GUI for displaying of the present invention can separately compose each of the windows drawing with the pictures into the corresponding one of the buffers by the second GPU to reduce the processing overhead of the first GPU while determining that the utilization for the first GPU has exceeded the predefined threshold value, thereby improving the processing efficiency of the GPU and further increasing the frame rate for displaying the GUI, so as to display coherent and smooth pictures on the screen for viewing by human eyes.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for generating a Graphical User Interface (GUI) for displaying, wherein the GUI is generated based on a plurality of windows, comprising:

separately drawing a plurality of pictures for generating the GUI into the plurality of windows;

separately composing each of the plurality of windows drawn with the plurality of pictures into a corresponding one of a plurality of buffers;

mixing the plurality of pictures in the plurality of buffers to obtain the GUI for displaying on a screen;

wherein the plurality of windows comprise first and second windows, the plurality of pictures comprise a background layer and a dynamic picture and the plurality of buffers comprise first and second buffers;

the step of separately drawing the plurality of pictures for generating the GUI into the plurality of windows is performed by: drawing the background layer into the first window and drawing the dynamic picture into the second window;

determining whether the GUI is displayed for the first time or needs to be refreshed;

if the GUI is displayed for the first time, the step of separately composing each of the plurality of windows drawn with the plurality of pictures into the corresponding one of the plurality of buffers is performed by: composing the first window drawing with the background layer into the first buffer and composing the second window drawn with the dynamic picture into the second buffer;

if the GUI needs to be refreshed, the step of separately composing each of the plurality of windows drawn with the plurality of pictures into the corresponding one of the plurality of buffers is performed by: composing the second window drawn with the dynamic picture into the second buffer and keeping contents in the first buffer unchanged.

2. The method of claim 1, wherein the step of separately composing each of the plurality of windows drawn with the plurality of pictures into the corresponding one of the plurality of buffers further comprises:

establishing mapping relationships of the plurality of windows drawn with the plurality of pictures and the plurality of buffers; and separately composing each of the plurality of windows drawn with the plurality of pictures into the corresponding one of the plurality of buffers according to the mapping relationships.

3. The method of claim 2, wherein the step of establishing the mapping relationships of the plurality of windows drawn with the plurality of pictures and the plurality of buffers further comprises:

establishing the mapping relationships of the plurality of windows drawn with the plurality of pictures and the plurality of buffers according to attributes of the plurality of pictures.

4. The method of claim 3, wherein the step of establishing the mapping relationships of the plurality of windows drawn with the pictures and the plurality of buffers according to the attributes of the plurality of pictures further comprises:

establishing the mapping relationship between the first window drawn with the background layer and the first buffer and establishing the mapping relationship between the second window drawn with the dynamic picture and the second buffer.

5. The method of claim 1, wherein the steps of separately drawing the plurality of pictures for generating the GUI into the plurality of windows and separately composing each of the plurality of windows drawn with the pictures into the corresponding one of the plurality of buffers further comprise:

separately drawing the plurality of pictures for generating the GUI into the plurality of windows by a first graphic processing unit (GPU);

determining whether a utilization of the first GPU has exceeded a predetermined threshold;

if the utilization of the first GPU has exceeded the predetermined threshold, composing the plurality of windows drawn with the plurality of pictures into the plurality of buffers by a second GPU.

6. The method of claim 5, wherein the first GPU is a three-dimensional GPU and the second GPU is a two-dimensional GPU.

7. A method for generating a Graphical User Interface (GUI) for displaying, wherein the GUI is generated based on a plurality of windows, comprising:

separately drawing a plurality of pictures for generating the GUI into the plurality of windows;

separately composing each of the plurality of windows drawn with the plurality of pictures into a corresponding one of a plurality of buffers;

mixing the plurality of pictures in the plurality of buffers to obtain the GUI for displaying on a screen;

wherein the plurality of windows comprise first, second and third windows, the plurality of pictures comprise a first-layer picture, a second-layer picture and a third-layer picture, wherein the size of the first-layer picture is as same as that of the second-layer picture, and the plurality of buffers comprise first and second buffers;

the step of separately drawing the plurality of pictures for generating the GUI into the plurality of windows is performed by: drawing the first-layer picture into the first window, drawing the second-layer picture into the second window and drawing the third-layer picture into the third window; and composing the first window drawn with the first-layer picture and the second window drawn with the second-layer picture into the first buffer, and composing the third window drawn with the third-layer picture into the second buffer.

8. The method of claim 7, wherein the step of separately composing each of the plurality of windows drawing with the plurality of pictures into the corresponding one of the plurality of buffers further comprises:

establishing mapping relationships of the plurality of windows drawn with the plurality of pictures and the plurality of buffers; and separately composing each of the plurality of windows drawn with the plurality of pictures into the corresponding one of the plurality of buffers according to the mapping relationships;

wherein the step of establishing the mapping relationships of the plurality of windows drawn with the plurality of pictures and the plurality of buffers further comprises:

establishing the mapping relationships of the plurality of windows drawn with the plurality of pictures and the plurality of buffers according to the sizes of the pictures.

9. The method of claim 8, the step of establishing the mapping relationships of the plurality of windows drawn with the plurality of pictures and the plurality of buffers according to the attributes of the plurality of pictures further comprises:

establishing the mapping relationship between the first window drawn with the first-layer picture and the first buffer, establishing the mapping relationship between the second window drawn with the second-layer picture and the first buffer, and establishing the mapping relationship between the third window drawn with the third-layer picture and the second buffer.

10. A device for generating Graphical User Interface (GUI) for displaying, comprising:

a plurality of buffers;

a first graphic processing unit (GPU) coupled to the plurality of buffers, separately drawing a plurality of pictures into a plurality of windows and separately composing each of the plurality of windows drawn with the plurality of pictures into a corresponding one of the buffers; and a mixer coupled to the buffers, mixing the plurality of pictures in the plurality of buffers to obtain the GUI for displaying on a screen;

wherein the plurality of windows comprise first and second windows, the plurality of pictures comprise a background layer and a dynamic picture and the plurality of buffers comprise first and second buffers, wherein the first GPU further draws the background layer into the first window and draws the dynamic picture into the second window;

wherein the window management module further determines whether the GUI is displayed for the first time or needs to be refreshed; if the window management module determines that the GUI is displayed for the first time, the first GPU composes the first window drawing with the background layer into the first buffer and composes the second window drawing with the dynamic picture into the second buffer; if the window management module determines the GUI needs to be refreshed, the first GPU composes the second window drawing with the dynamic picture into the second buffer and keeps contents in the first buffer unchanged.

11. The device of claim 10, wherein the device further comprises:

a window management module, establishing mapping relationships of the plurality of windows drawn with the plurality of pictures and the plurality of buffers, wherein the first GPU separately composes each of the plurality of windows with the pictures into the corresponding one of the plurality of buffers according to the mapping relationships.

12. The device of claim 11, wherein the window management module further establishes the mapping relationships of the plurality of windows drawn with the plurality of pictures and the plurality of buffers according to attributes of the plurality of pictures.

13. The device of claim 12, wherein the window management module further establishes the mapping relationship between the first window drawn with the background layer and the first buffer and establishes the mapping relationship between the second window drawn with the dynamic picture and the second buffer.

14. The device of claim 10, further comprising a determination module for determining whether a utilization of the first GPU has exceeded a predetermined threshold and if the determination module determines that the utilization of the first GPU has exceeded the predetermined threshold, a second GPU composes the plurality of windows drawn with the pictures into the plurality of buffers.

15. The device of claim 14, wherein the first GPU is a three-dimensional GPU.

16. A device for generating Graphical User Interface (GUI) for displaying, comprising:

a plurality of buffers;

a first graphic processing unit (GPU) coupled to the plurality of buffers, separately drawing a plurality of pictures into a plurality of windows and separately composing each of the plurality of windows drawn with the plurality of pictures into a corresponding one of the buffers; and a mixer coupled to the buffers, mixing the plurality of pictures in the plurality of buffers to obtain the GUI for displaying on a screen;

wherein the plurality of windows comprise first, second and third windows, the plurality of pictures comprise a first-layer picture, a second-layer picture and a third-layer picture, wherein the size of the first-layer picture is as same as that of the second-layer picture, and the plurality of buffers comprise first and second buffers; the first GPU further draws the first-layer picture into the first window, draws the second-layer picture into the second window and draws the third-layer picture into the third window;

wherein the first GPU further composes the first window drawn with the first-layer picture and the second window drawn with the second-layer picture into the first buffer and composes the third window drawn with the third-layer picture into the second buffer.

17. The device of claim 16, wherein the window management module further establishes the mapping relationships of the plurality of windows drawn with the pictures and the plurality of buffers according to the sizes of the pictures.

18. The device of claim 17, wherein the window management module further establishes the mapping relationship between the first window drawn with the first-layer picture and the first buffer, establishes the mapping relationship between the second window drawn with the second-layer picture and the first buffer, and establishes the mapping relationship between the third window drawn with the third-layer picture and the second buffer.

* * * * *